United States Patent
Radermacher et al.

(10) Patent No.: US 8,106,599 B2
(45) Date of Patent: Jan. 31, 2012

(54) SWITCHED LIGHT ELEMENT ARRAY AND METHOD OF OPERATION

(75) Inventors: Harald Josef Günther Radermacher, Aachen (DE); Volkmar Schulz, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 232 days.

(21) Appl. No.: 12/443,859

(22) PCT Filed: Sep. 20, 2007

(86) PCT No.: PCT/IB2007/053821
§ 371 (c)(1),
(2), (4) Date: Dec. 1, 2009

(87) PCT Pub. No.: WO2008/041152
PCT Pub. Date: Apr. 10, 2008

(65) Prior Publication Data
US 2010/0164399 A1    Jul. 1, 2010

(30) Foreign Application Priority Data
Oct. 6, 2006 (EP) .................................. 06121876

(51) Int. Cl.
*G05F 1/00* (2006.01)
*H05B 41/00* (2006.01)

(52) U.S. Cl. .................................. 315/291; 315/185 R (58) Field of Classification Search .................. 315/291, 315/307, 312, 224, 185 R, 185 S, 200 A, 315/209 R
See application file for complete search history.

(56) References Cited

U.S. PATENT DOCUMENTS

| 5,736,881 | A | 4/1998 | Ortiz |
| 6,351,079 | B1 * | 2/2002 | Willis .................. 315/200 A |
| 6,844,681 | B2 * | 1/2005 | Serizawa et al. ............. 315/77 |
| 7,023,147 | B2 * | 4/2006 | Colby et al. ............... 315/291 |
| 7,906,915 | B2 * | 3/2011 | Coley .................... 315/185 S |
| 2005/0002188 | A1 | 1/2005 | Bucher et al. |
| 2006/0022916 | A1 | 2/2006 | Aiello |

FOREIGN PATENT DOCUMENTS
EP    1320284 A2    6/2003

* cited by examiner

Primary Examiner — Douglas W Owens
Assistant Examiner — Minh D A (57) ABSTRACT

A switched light element array includes first, second and third light emitting elements, and first and second switches. The first light emitting element includes first and second terminals, and the second light emitting element includes a first terminal, and a second terminal coupled to the second terminal of the first light emitting element. The third light emitting element includes a first terminal coupled to the first terminal of the first light emitting element and a second terminal. The first switch includes a first terminal coupled to each of the first terminals of the first and third light emitting elements and a second terminal coupled to the first terminal of the second light emitting element. The second switch includes a first terminal coupled to the second terminal of the third light emitting element, and a second terminal coupled to each of the second terminals of the first and second light emitting elements.

17 Claims, 8 Drawing Sheets

FIG. 5

SWITCHED LIGHT ELEMENT ARRAY AND METHOD OF OPERATION

This application is a national stage application under 35 U.S.C. §371 of International Application No. P PCT/IB07/53821 filed on Sep. 20, 2007, which claims priority to European Application No. 06121876.4, filed on Oct. 6, 2006, incorporated herein by reference.

FIELD OF THE INVENTION

The present invention relates generally to devices employing light emitting elements, and more particularly to light element arrays, devices, and methods of operating same.

BACKGROUND OF THE INVENTION

Light emitting elements, such as light emitting diodes (LEDs), enjoy increasing use in a wide range of applications, some examples being back light sources in liquid crystal displays, flashes for charge coupled device cameras, general lighting, as well as other applications. In many of these applications, LEDs of different colors are used, e.g. arranged in an array, to produce various color points. The operating conditions for the LED array may be equally as diverse as the array's application, such operating conditions requiring, e.g., low power, high operating temperature, and fast LED activation and deactivation times.

Typically, each LED array is powered by a driver circuit operable in one of several different driving modes depending upon the desired light effect. The LED driver circuit may be driven in a constant current mode, whereby the LED array is supplied a constant current to provide light at a constant intensity. The LED driver may also operate in a variable current mode, whereby the LED array is supplied a varying current to produce a varying intensity of light. The LED driver may also operate in a pulse width modulation (PWM) mode, whereby the LED array is supplied using a PWM current waveform in which the on period of the PWM waveform determines the time period over which the LED array is activated, and thus determines the light output and thus the color point of the LED array. The PWM mode may be implemented with either the constant current mode or the varying current mode to provide a combination of each of these attributes, i.e., constant or varying light intensity.

Unfortunately, a large number of circuit components are needed to provide the aforementioned functionality. For example, when a constant current, PWM mode of operation is desired, at least one current source for the LED array and one switch for each LED in the array is typically required. In the case in which a varying current mode of operation is desired, a complex current source operable to quickly change current levels is required. In the case in which a varying current, PWM mode of operation is desired, a complex current source and one switch per LED within the array is usually required.

A high part count for operation and control of the LED array degrades LED performance in a number of ways, each component increasing power consumption of the LED array and contributing parasitic effects which operate to reduce activation and deactivation times of the LEDs. Furthermore, when the LED array is implemented in a high temperature application, each component will require a high temperature rating, a capability that further increases the cost for each required component. Acknowledgement of the problems associated with high part count LED drivers can be seen in U.S. Pat. No. 5,736,881 to Ortiz disclosing an PWM LED driver and LED array configuration in which one current source is used to control multiple LED strings.

SUMMARY OF THE INVENTION

Accordingly, it may be desirable to provide a light element array and method of operation which can provide control of separate light emitting elements within an LED array, and which requires fewer circuit components.

This and other aspects of the invention may be achieved in accordance with the independent claims of the present invention.

In one embodiment of the invention, a light element array is presented and includes first, second, and third light emitting elements, and first and second switches. The first light emitting element includes first and second terminals. The second light emitting element includes a first terminal and a second terminal coupled to the second terminal of the first light emitting element. The third light element includes a first terminal coupled to the first terminal of the first light emitting element and a second terminal. The first switch includes a first terminal coupled to each of the first terminals of the first and third light emitting elements, and a second terminal coupled to the first terminal of the second light emitting element. The second switch includes a first terminal coupled to the second terminal of the third light emitting element, and a second terminal coupled to each of the second terminals of the first and second light emitting elements.

In another embodiment of the invention, a light emitting device is presented and includes a light element array as described above and herein, a power supply and a controller. The power supply includes a control input, and a power output coupled to supply current to the light element array. The controller includes a first output coupled to the control input of the power supply, a second output coupled to first switch of the light element array, and a third output coupled to the second switch of the light element array, the first output operable to provide a control signal to the power supply to set output level conditions of the power supply, and the second output operable to provide a control signal to control the state of the first switch, and the third output operable to provide a control signal to control the state of the second switch.

In a further embodiment of the invention, a method for operating a light element array is presented, the light element array as described above and herein, the method including the processes of selecting the first light emitting element, that operation involving controlling each of said first and second switches to either an open state or a closed state, and supplying current to the light element array. At least a portion of the supplied current is supplied to: (i) the first light emitting element when each of the first and second switches are in an open state, (ii) the second light emitting element when the first switch is in a closed state, and the second switch is in an open state, and (iii) the third light emitting element when the first switch is in an open state, and the second switch is in a closed state.

It may be seen as a gist of an exemplary embodiment of the present invention implements light emitting elements having different operating voltage points (i.e., forward voltages for LEDs) in order to reduce the number of switches below the 1:1 ratio of switches to light emitting elements, for example, providing one switch for two light emitting elements, two switches for three light emitting elements, or two switches for four light emitting elements. In this manner, the component count for the light element array can be reduced, providing a faster, more power efficient and lower cost light emitting device.

The following describes exemplary features and refinements of the light element array, although these features and refinements will apply to the light emitting device, and method of operating the light element array as well. In one embodiment, the first and second terminals of the first light element are coupled to first and second power supply rails. Further, the first, second, and third light emitting elements are characterized by respective first, second and third operating voltages $V_{OP1}$, $V_{OP2}$, $V_{OP3}$, the relative relationships defined such that, when the first switch is in a closed state and the second switch is in an open state, the second light emitting element is operable to receive at least a portion of current supplied to the power supply rails. Said relationship being further defined, such that, when the first switch is in an open state and the second switch is in a closed state the third light emitting element is adapted to receive at least a portion of current supplied to the power supply rails. In a particular embodiment, the relationship among the first, second, and third operating voltages is defined as $V_{OP1} > V_{OP2}$, $V_{OP3}$. Such an arrangement in the operating voltages allows selection between the various light emitting elements.

In a further embodiment, the light element array includes a fourth light emitting element having a first terminal coupled to the second terminal of the first switch, and a second terminal coupled to the first terminal of the second switch, the fourth light emitting element characterized by a fourth operating voltage $V_{OP4}$ at or above which the fourth light emitting element is operable to emit light. In a specific implementation, the fourth light emitting element is adapted to receive at least a portion of current supplied to the light element array when the first and second switches are each in a closed state. Further specifically, the first, second, third and fourth operating voltages ($V_{OP1}$, $V_{OP2}$, $V_{OP3}$, $V_{OP4}$) are defined by the equation:

$$V_{OP1} > V_{OP2}, V_{OP3} > V_{OP4}$$

In a further embodiment, the first, second, third or fourth (when implemented) light emitting elements are selected from a group consisting of a light emitting diode, an organic light emitting diode, an AC light emitting diode, a laser diode or an incandescent light. Still further, a storage element, for example a capacitor, may be optionally coupled to one or more of the first, second, third or fourth (when implemented) light emitting elements. The storage element may be used to increase the duration of illumination for one or more of the light emitting elements, or to enable concurrent illumination of two or more light emitting elements.

In a further embodiment, the fourth light emitting element (when implemented) includes at least one light emitting diode, and further each of the first, second and third light emitting elements include at least one additional light emitting diode as included within the fourth light emitting element, or is composed of a different semiconductor material than the at least one light emitting diode included within the fourth light emitting element. Such an arrangement can be used to provide a lower operating voltage to the fourth light emitting element.

The following describes exemplary features and refinements of the method for operating the light element array, although these features and refinements will apply to the light element array and light emitting device as well. In a further embodiment, currents supplied to the first, second, third and fourth light emitting elements are average currents determined in accordance with the equation $$\bar{I}_i = I_i \cdot \frac{t_i}{T}$$

where $I_i$ is the amplitude of the current available to the selected $i^{th}$ light emitting element, T is the time period of the current supplied to the $i^{th}$ light emitting element, and $t_i$ is an activation period during which each of the first and second switches are in their respective states operable to supply current $I_i$ to the ith light emitting element.

The operations of the foregoing methods may be realized by a computer program, i.e. by software, or by using one or more special electronic/optimization circuits, i.e. in hardware, or in hybrid/firmware form, i.e. by software components and hardware components. The computer program may be implemented as computer readable instruction code in any suitable programming language, such as, for example, VHDL, assembler, JAVA, C++, and may be stored on a computer-readable medium (removable disk, volatile or non-volatile memory, embedded memory/processor, etc.), the instruction code operable to program a computer or other such programmable device to carry out the intended functions. The computer program may be available from a network, such as the WorldWideWeb, from which it may be downloaded.

These and other aspects of the present invention will become apparent from and elucidated with reference to the embodiment described hereinafter.

DETAILED DESCRIPTION OF THE PREFERRED EMBODIMENTS

Figure 1:
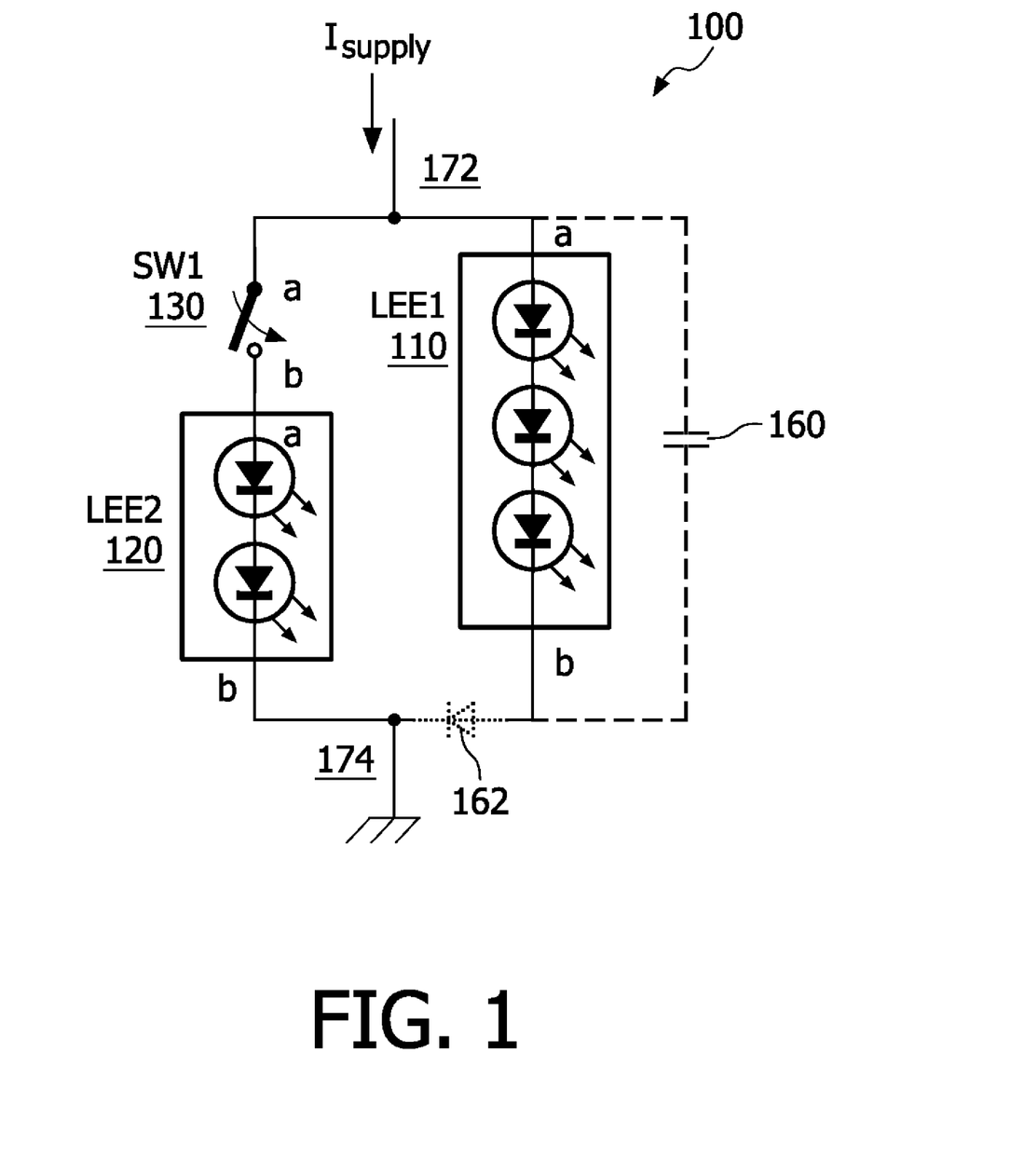
FIG. 1 illustrates an exemplary embodiment of a light element array in accordance with the present invention.

FIG. 1 illustrates an exemplary embodiment of a light element array 100 in accordance with the present invention. The array 100 includes a first light emitting element (LEE) 110 having a first terminal 110a and a second terminal 110b, a second LEE 120 having a first terminal 120a and a second terminal 120b coupled to the second terminal 110b of the first LEE 110, and a switch 130 having a first terminal 130a coupled to the first terminal 110a of the first LEE 110, and a second terminal 130b coupled to the first terminal 120a of the second LEE 120. As used herein, the term "light emitting element" or "LEE" refers to any light emitting element, circuit, device or component, such as, light emitting diodes (LEDs), organic light emitting diodes (OLEDs), AC LEDs, laser diodes, or any other lighting element, such as incandescent light and the like.

The first terminal of the switch 130 and the first terminal of the first LEE 110 are commonly coupled to a first power supply rail 172, and each of the second terminals of the first and second LEEs are coupled to a second supply rail 174. In a specific embodiment of the invention further illustrated below, a current $I_{supply}$ is supplied to the array 100 via the supply rails.

Further optionally, the array 100 includes a storage element coupled to receive energy from the power supply rails and to provide energy to one or more of the LEEs 110 and 120. In the exemplary embodiment shown, a capacitor 160 is coupled across first LEE 110, the parallel-connection of capacitor 160 and LEE 110 coupled in series with a decoupling element 162. The decoupling element 162 may be implemented as a non-light emitting diode, e.g. a Schottky diode with low forward voltage drop. Alternatively, the use of a light emitting element is possible. The purpose of the decoupling element 162 is to prevent discharge of the capacitor 160 during selection of the second LEE 120. The capacitor 160 is operable to provide power to the first LEE 110 during periods when switch 130 is closed. In another embodiment, the storage element 160 may be an inductor coupled in series with LEE 110 and/or 120.

In a specific embodiment of the invention, the first and second LEEs 110 and 120 are substantially operable at different bias conditions, e.g., different operating voltages. Specifically, the first LEE 110 is characterized by a first voltage at or above which the first LEE 110 is substantially operable to emit light. Similarly, the second LEE 120 is characterized by a second voltage at or above which the LEE 120 is substantially operable to emit light. The relationship between the first and second operating voltages $V_{OP1}$ and $V_{OP2}$ can be used to provide selectivity in operating LEE 110, and/or LEE 120. Specifically, the relationship between the first and second operating voltages $V_{OP1}$ and $V_{OP2}$ can be defined such that the second LEE 120 is adapted to receive at least some of the energy supplied to the array 100 via the power supply rails 172 and 174 when the first switch 130 is in a closed position. In a particular embodiment, the first operating voltage $V_{OP1}$ is higher than the second operating voltages $V_{OP2}$.

In one exemplary embodiment, the LEEs 110 and 120 are circuits, each of which includes at least one light emitting diode. In such an embodiment, each LEE 110, 120 may employ a plurality (i.e., 2, 3, 5, 10, or more) of serial-coupled diodes, parallel-coupled diodes, or a combination of serial and parallel coupled diodes. Furthermore, different materials may be employed to fabricate the light emitting diodes, for example, Gallium-Nitride, Gallium-Phosphide, or other materials.

In one embodiment of the invention, the first operating voltage $V_{OP1}$ of the first LEE 110 is greater than the second operating voltage $V_{OP2}$ of the second LEE 120. This difference in operating voltages may be accomplished through a variety of means. For example, in the embodiment in which LEEs 110 and 120 are LED circuits and LEE 110 exhibits a higher operating voltage than LEE 120, the first LED circuit 110 may include at least one additional series-coupled light emitting diode in comparison with the light emitting diodes of the second LED circuit 120. In another example, different semiconductor materials and/or processes may be used to fabricate the light emitting diodes within the first LED circuit 110 to have a higher forward voltage compared to the forward voltage of the light emitting diodes within the second LED circuit 120. In another example, additional circuit components (resistive divider, diodes etc.) may be used to provide the first LED circuit 110 with higher forward voltages compared to the second LED circuit 120. Those skilled in the art will appreciate that a variety of techniques may be used to impart a higher forward voltage to the first LED circuit 110 in comparison to the second LED circuit 120.

Figure 2A:
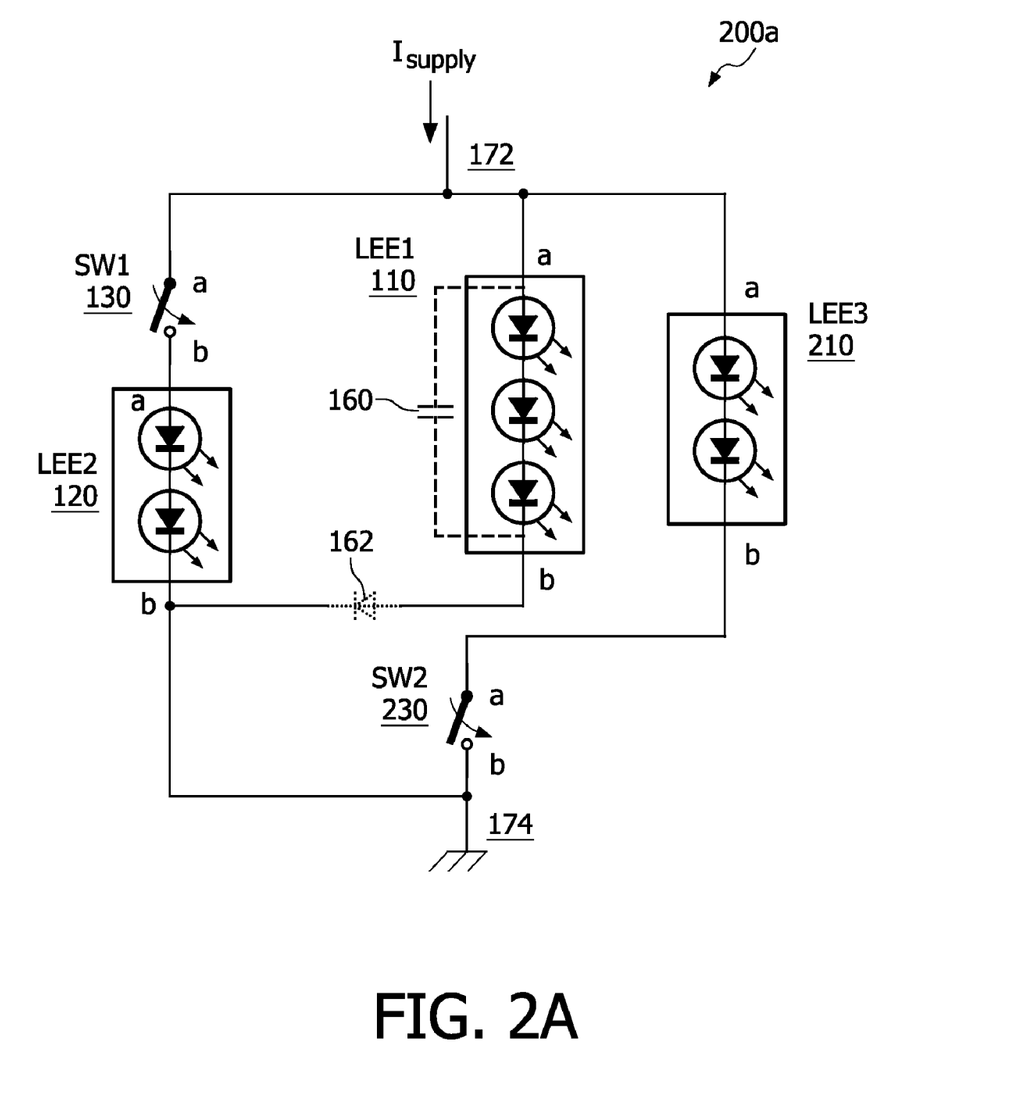
FIG. 2A illustrates a further exemplary embodiment of a light element array in accordance with the present invention.

FIG. 2A illustrates a further exemplary light element array 200a in accordance with the present invention, with previously described feature retaining their reference numerals. In this embodiment, the array 200a includes a third LEE 210, and a second switch 230.

The third LEE includes first and second terminals 210a and 210b, the first terminal 210a coupled to a common node including the first terminal 110a of the first LEE 110, and the first terminal 130a of the first switch 130. The second switch 230 includes a first terminal 230a coupled to the second terminal of the third LEE 210, and a second terminal 230b coupled to the second terminals of the first and second LEEs 110 and 120 and the second power supply rail 174.

The third LEE 210 is characterized by a third operating voltage ($V_{OP3}$) at or above which the third LEE 210 is substantially operable to emit light. The relationship among the first, second, and third operating voltages $V_{OP1}$, $V_{OP2}$, $V_{OP3}$ can be used to provide selectivity in operating the LEEs 110, 120, and 210. Specifically, the relationship among the first, second, and third operating voltages $V_{OP1}$, $V_{OP2}$, $V_{OP3}$ can be defined such that the second light emitting element 120 is adapted to receive at least some of the energy supplied to the array 200a via the power supply rails 172 and 174 when the first switch 130 is in an closed position and the second switch 230 is in an open position, the third light emitting element 210 is adapted to receive at least some of the energy supplied to the light element array 200a via the power supply rails 172 and 174 when the first switch 130 is in an open position and the second switch 230 is in a closed position.

Further specifically, the relationship between the first, second, and third operating voltages can be defined such that the second and third LEEs 120 and 210 are operable to receive substantially all of the energy supplied to the array during their corresponding selection by the aforementioned settings of the first and the second switch.

In a specific embodiment of the aforementioned operating voltage relationships, the operating voltage $V_{OP1}$ corresponding to the first LEE 110 exhibits the highest operating voltage, resulting in the following relationship:

$$V_{OP1} > V_{OP2}, V_{OP3}$$

As explained above, the operating voltages of the first and second LEEs $V_{OP1}$ and $V_{OP2}$ may be selected such that when the first switch is closed and the second switch is open, the second LEE 120 receives at least some current (the supply current in this case being shared with the first LEE 110), and in a particular embodiment substantially all the supply current $I_{supply}$, when, for example, $V_{OP2} \ll V_{OP1}$. Further exemplary, the relationship of the first and third operating voltages $V_{OP1}$ and $V_{OP3}$ can be arranged such that when the first switch is open and the second switch is closed, the third LEE 210 receives at least some of the supplied current (the supply current possibly being shared with the first LEE 110), and in a particular embodiment, the third LEE 210 receives substantially all of the supply current, when, e.g., $V_{OP3} \ll V_{OP1}$.

In the foregoing embodiments, three of four possible switching states are used. Control of the array 200a may be provided so as to preclude operation in the fourth state in which both of the first and second switches 130 and 230 are in a closed state. Alternatively, the fourth switching state may be optionally employed, whereby the current supplied to each of the first, second and third LEEs 110, 120 and 210 is determined by the LEEs' corresponding operating voltages. For example, each of the three LEEs may receive substantially the same portion of current when the three operating voltages are substantially the same. Further exemplary of the aforementioned condition in which $V_{OP1} \gg V_{OP2}, V_{OP3}$, the first LEE 110 will receive the least (if any) supply current, and the portions of supply current provided to the second and third LEEs 120 and 210 will depend upon the relationship between their respective operating voltages. For example, if $V_{OP1} \gg V_{OP2} \approx V_{OP3}$, then each of the second and third LEEs 120 and 210 will receive substantially the same portions of supply current, with the first LEE 110 receiving little if any portion of the supply current. Further exemplary, if $V_{OP1} \gg V_{OP2} > V_{OP3}$, then the third LEE 210 will receive the largest portion (and possibly all) of the supply current, second LEE 120 receiving a lesser portion (and possibly none) of the supply current, and first LEE 110 receiving the smallest portion (and possible none) of the supply current. Accordingly, current can be supplied to any one or more LEEs in a particular amount by arranging the operating voltages in a corresponding manner.

Similar to the array 100 of FIG. 1 the array 200a may optionally include one or more storage elements coupled to receive energy from the power supply rails and to provide energy to one or more of the LEEs 110, 120 and 210. In the exemplary embodiment shown, a capacitor 160 is coupled across first LEE 110, the parallel-connection of capacitor 160 and LEE 110 coupled in series with a decoupling element 162. The decoupling element 162 may be implemented as a non-light emitting diode, e.g. a Schottky diode with low forward voltage drop. Alternatively, the use of a light emitting element is also possible. The purpose of the decoupling element 162 is to prevent discharge of the capacitor 160 during selection of LEE 120 or 210. The capacitor 160 is operable to provide power to the first LEE 110 during periods when one or both switches 130 and 230 are closed. In another embodiment, the storage element 160 may be an inductor coupled in series with LEE 110, 120, and/or 210

Figure 2B:
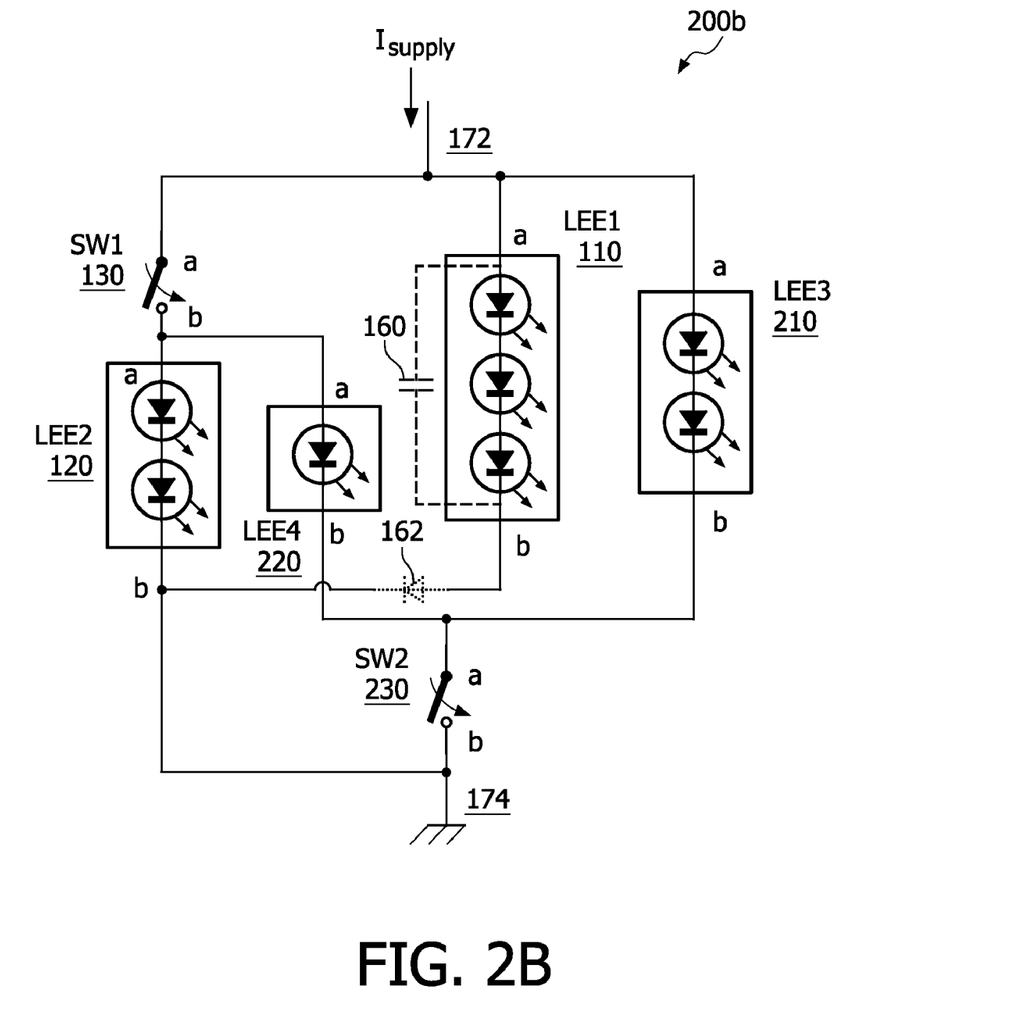
FIG. 2B illustrates a further exemplary embodiment of a light element array in accordance with the present invention.

FIG. 2B illustrates a further exemplary embodiment of a light element array 200b in accordance with the present invention, with previously identified features retaining their reference indicia. The first, second and third LEEs 110, 120 and 210 and switches 130 and 230 are coupled and described above in FIG. 2A, and a fourth LEE 220 is coupled between the second terminal of the second switch 130, and the first terminal of the second switch 230, the fourth LEE 220 characterized by a operating voltage at or above which it will substantially operate to emit light.

The current supplied to the fourth LEE 220 in the fourth switching state (where the first and second switches are in the closed position) will depend upon its relationship to the other three operating voltages $V_{OP1}$, $V_{OP2}$ and $V_{OP3}$. Continuing with the foregoing example in which the first operating voltage VOP1 is the highest, $V_{OP1} \gg V_{OP4}$, then the current delivered to the fourth LEE in the fourth switching state will depend upon the relationship of $V_{OP4}$ to $V_{OP2}$ and $V_{OP3}$. For example, if $V_{OP1} \gg V_{OP2} \approx V_{OP3} \approx V_{OP4}$, then each of the second, third and fourth LEEs 120, 210 and 220 will receive substantially the same portions of supply current, with the first LEE 110 receiving little if any portion of the supply current. The operating voltages can also be arranged, such that the fourth LEE 220 will receive most, if not all of the supplied current, e.g., when $V_{OP1} \gg V_{OP2}$, $V_{OP3} \gg V_{OP4}$. In this manner, arrangement of the operating voltages can be made so as to enable routing of the supply current in the desired quantity to each of the first, second, third and fourth LEEs 110, 120, 210 and 220.

The skilled person will appreciated that the LEEs may include those features described in connection with FIG. 2A above. For example, any of the one or more LEEs 110, 120, 210 and 220 illustrated in FIG. 2A may be coupled to a storage element, provided in one embodiment, as a parallel coupled capacitor (and accompanying decoupling element 162), as described and illustrated above.

The array 200b with first, second, third and fourth LEEs 110, 120, 210 and 220 may be modified to have a lower number of LEEs, e.g., three LEEs by omitting either the second, third or fourth LEEs 120, 210, or 220. In a particular embodiment, the fourth LEE 220 is omitted, resulting in the array 200a illustrated in FIG. 2A.

Figure 2C:
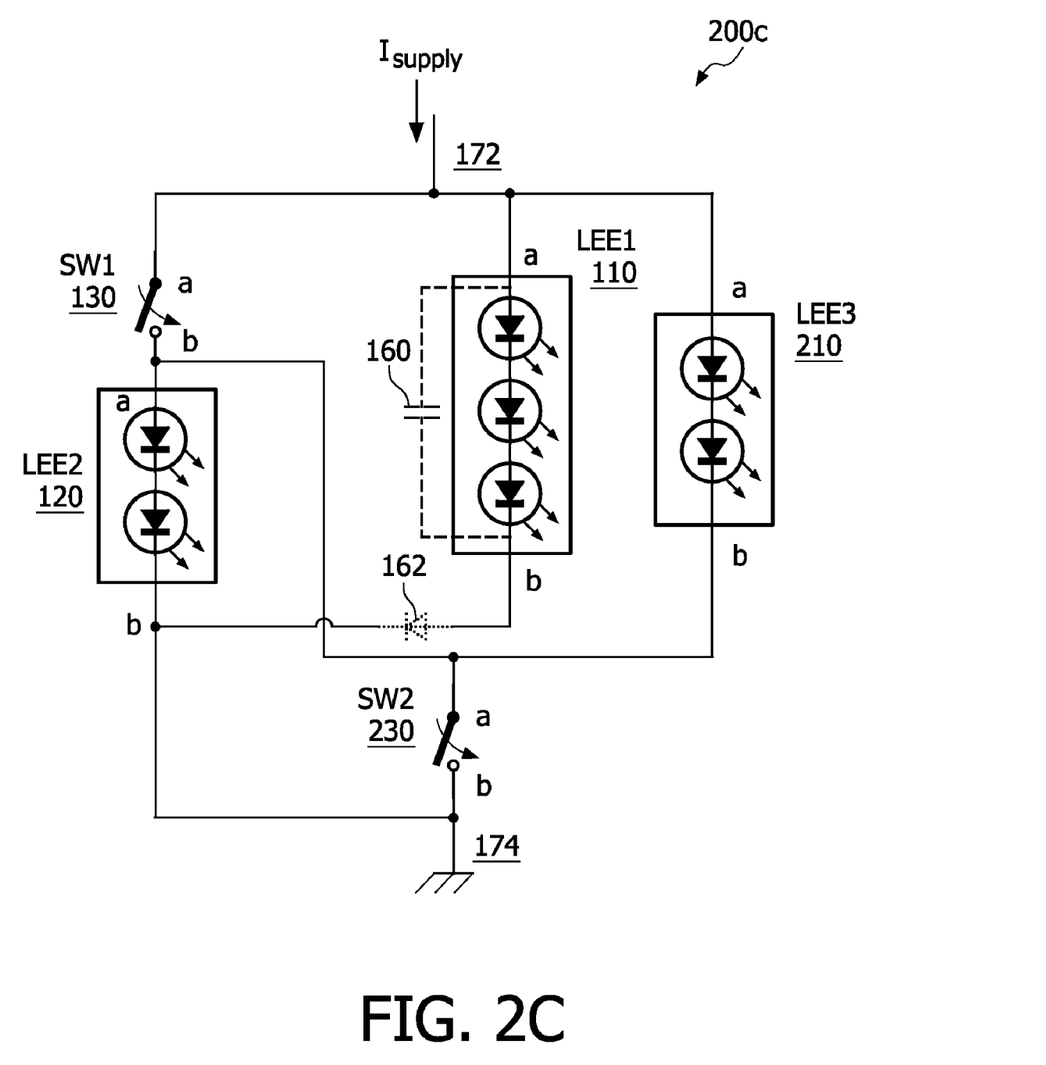
FIG. 2C illustrates a further exemplary embodiment of a light element array in accordance with the present invention.

FIG. 2C illustrates a further exemplary light element array 200c in accordance with the invention, in which previously described features retain their reference indicia. The first, second and third LEEs 110, 120 and 210 and switches 130 and 230 are coupled and described above in FIG. 2A, and a short circuit is coupled between the second terminal of the second switch 130, and the first terminal of the second switch 230. This configuration may be used to provide a three element array (e.g., in FIG. 2A) in which the fourth switch state is used as a deactivation state for the array 200.

Figure 3:
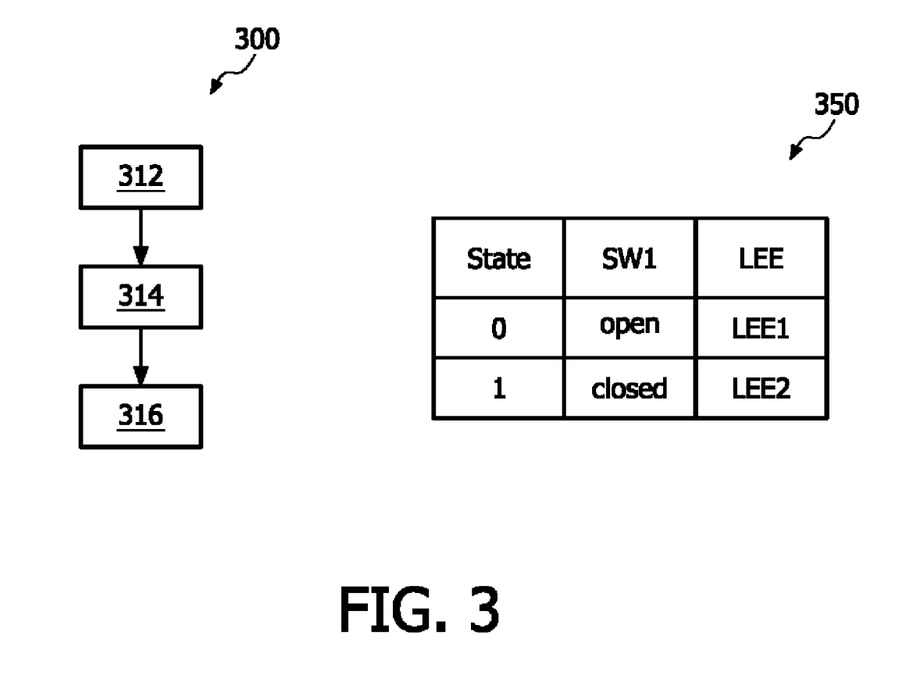
FIG. 3 illustrates a method for operating the light element array shown in FIG. 1 and corresponding state table in accordance with the present invention.

FIG. 3 illustrates an exemplary method for operating the light element array 100 shown in FIG. 1 and corresponding state table 350 in accordance with the present invention, and in absence of energy storage elements, such as parallel-coupled capacitors 160. The method 300 includes operation 312, where a supply current $I_{supply}$ is set, and at 314 a decision is made as to whether current is to be supplied to the second LEE 120 to enable it to emit light. At 316, the state of switch 130 is set either to an open or a closed state, depending upon if LEE 120 is to emit light; switch 130 controlled to an open state if LEE 120 is to receive no supply current, or switch 130 controlled to a closed state if LEE 120 is to be supplied at least some current to emit light.

The current $I_{supply}$ set in operation 312 may provide a constant current level or a modulated, time-varying level. If the array 100 is to operate in state "0" in which the first LEE 110 emits light, the switch 130 is controlled into the open position. The current $I_{supply}$ will be supplied to the first LEE 110, thereby emitting light at its intended intensity. As switch 130 is open, no current is supplied to the second LEE 120, and accordingly no light produced thereby.

If the array 100 is to operate in state "1" in which the second LEE 120 receives at least some current to emit light, the switch is controlled into the closed position. Depending on the operating voltages of the first and the second LEE 110 and 120, the current may be conducted by one or both of the LEEs 110 and 120. In a particular embodiment of the invention, the operating voltages of LEE 110 and LEE120 are defined such that LEE 120 conducts at least a portion of the supply current $I_{supply}$. Such an arrangement may be realized, e.g., by constructing the second LEE 120 to have an operating voltage which is less than or equal to the operating voltage of the first LEE 110.

In another embodiment, operations 312-316 are performed such that substantially all of the supplied current $I_{supply}$ provided to the array is supplied to the second LEE 120. Such an arrangement may be realized, for example using the aforementioned techniques of constructing the second LEE 120 to have a substantially lower operating voltage, and/or voltage limiting the supplied current $I_{supply}$, the limited voltage being sufficiently above the operating voltage of the second LEE 120, and sufficiently below the operating voltage of the first LEE 110.

The average current supplied to the LEEs may also be computed for a periodic on-off sequence of the switch 130. In particular, currents $I_1$ and $I_2$ delivered to LEE110 and LEE 120 may be determined as:

$$\bar{I}_i = I_i \cdot \frac{t_i}{T}$$

where: $\bar{I}_i$ is the average current to be supplied to the $i^{th}$ LEE to achieve the LEE's
intended light level;
$I_i$ is the amplitude of the current available to the $i^{th}$ LEE;
T is the time period of the current supplied to the $i^{th}$ LEE
$t_i$ is a portion of time within the period T during which current I is supplied to
the $i^{th}$ LEE.

In the particular embodiment of FIG. 1, $t_1$ for state "1" is the time the switch 130 is kept in a closed state, resulting in an average current supplied to the second LEE 120 to operate it at the intended level. This approach of providing an average value of current based upon switching state duration is further described for array embodiments of FIGS. 2A and 2B below in FIGS. 4A and 4B.

The current amplitude $I_i$ is the current level which is available for supply to the selected LEE over activation period $t_1$. In one embodiment in which only the selected LEE conducts the current supplied to the array, the current amplitude $I_i$ will represent substantially the full amplitude of $I_{supply}$ provided to the array 100. In another embodiment in which one or more of the unselected LEEs conduct current, the supply current $I_{supply}$ will be divided, resulting in a current less than $I_{supply}$ being available for conduction by the selected LEE. Accordingly, the current amplitude $I_i$ in the aforementioned equation represent the current amplitude which is available to a LEE upon its selection by the array switches. Those skilled in art will appreciate that for LEEs receiving energy when they are not selected, the average current is the sum of all current received during the selected and the unselected time periods.

Alternatively, current $I_{supply}$ may itself be a varying current, e.g. a pulse width modulated (PWM) waveform to provide a particular quantity of current to the desired LEE 110 or 120, switch 130 being operable to select which of the LEEs 110 or 120 current is supplied to. For example, when switch 130 is in an open state, the current may be supplied to first LEE 110 only. When switch is 130 is in a closed state, the current is possibly supplied to both the first and second LEEs 110 and 120

If both LEE 110 and 120 are to be deactivated, the current supplying the LED array 100 is interrupted. This can be done by setting the current to zero in the operation 312. In this state, LEE 110 and LEE 120 will emit no light. In an alternative embodiment, the second LED circuits 120 may be replaced with a short circuit, such that state "1" is selected to provide no light output for the LED array 100. The skilled person will appreciate that operations 312, 314 and 316 may be performed in any order, and/or one or more of the operations may be performed concurrently as well.

State table 350 illustrates selection states, switch states, and selected LEEs in accordance with one specific embodiment of the invention in which the operating voltages are arranged such that LEE 120 carries substantially all current delivered to the supply rails if the switch 130 is in the closed state, and in which no storage element 160 is used. As illustrated, in state "0", switch 130 is in an open position and the first LEE 110 is selected to receive current, said current being the supply current $I_{supply}$ in one embodiment. In state "1," switch 130 is in a closed position, and in the particular embodiment shown LEE 120 is selected to receive current, which in an exemplary embodiment represents substantially all of the supply current $I_{supply}$. As explained above, the operating voltages $V_{OP1}$ and $V_{OP2}$ can be provided such that LEE 110 and LEE 120 provide a particular on/off profile, the illustrated embodiment of state 1 being representative of the aforementioned case in which $V_{OP2}$ is substantially lower than $V_{OP1}$, and/or the supplied current $I_{supply}$ is voltage limited sufficiently above $V_{OP2}$, and sufficiently below $V_{OP1}$. Alternatively, the voltage operating points can be altered to permit concurrent selection/light emission from both LEE 110 and LEE 120 in state 1, e.g., by providing the first and second LEEs 110 and 120 with similar operating voltages $V_{OP1}$ and $V_{OP2}$.

Figure 4A:
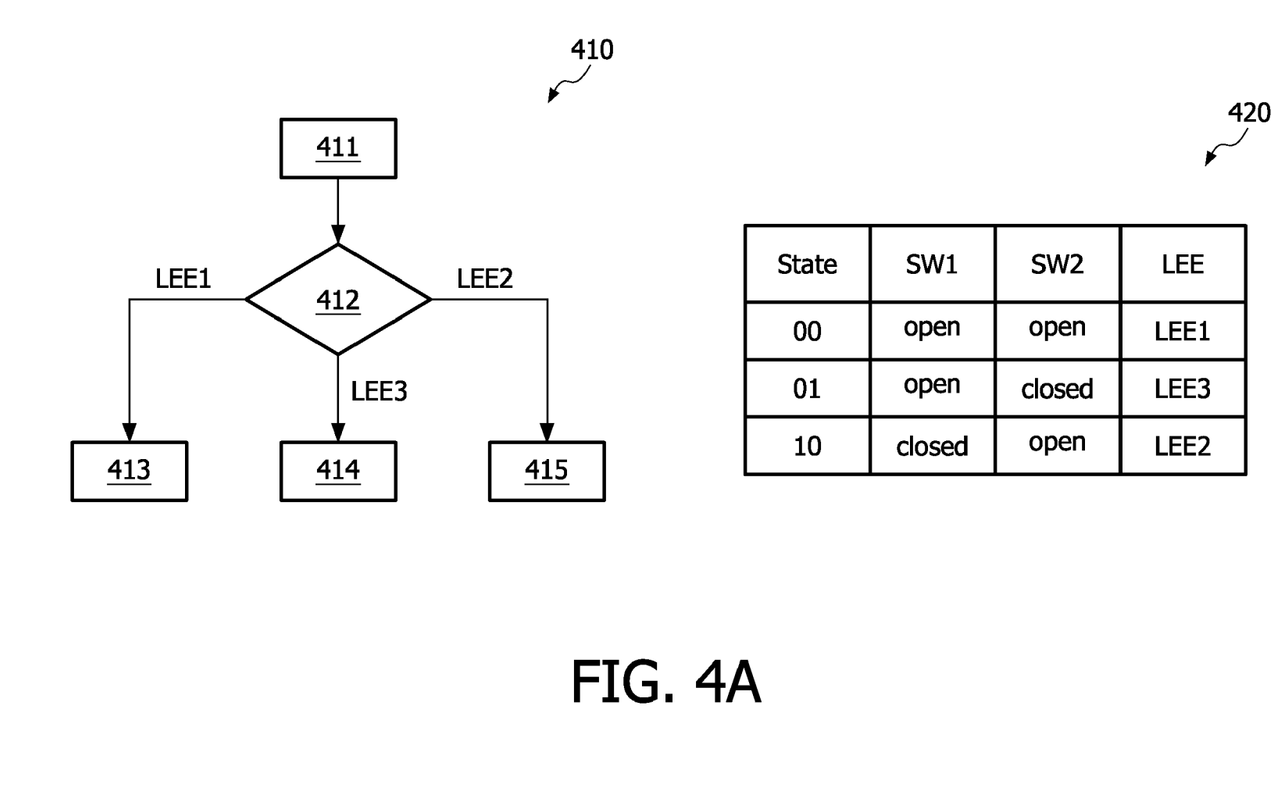
FIG. 4A illustrates a method for operating the light element array shown in FIG. 2A and corresponding state table in accordance with the present invention.

FIG. 4A illustrates a method 410 for operating the light element array 200a shown in FIG. 2A and corresponding state table 420 in accordance with the present invention. Initially at 411, the level of current $I_{supply}$ to be applied to the light element array is set. At 412, a determination is made as to which LEE 110, 120 and 210 is to be selected. If LEE 110 is to be selected to emit light, the process continues at 413, whereby both switches 130 and 230 are controlled to an open state (or remains in an open state if presently there). Current is delivered to the first LEE 110, which begins to emit light at its intended light level.

If the array 200a is to operate in state "01" in which the third LEE 210 emits light, the process continues at 414, whereby the first switch 130 is controlled to an open state, and the second switch 230 is controlled to a closed state. Current is delivered to the third LEE 210, which begins to emit light at its intended light level.

If the array 200a is to operate in state "10" in which the second LEE 120 emits light, the process continues at 415, whereby the first switch 130 is controlled to a closed state, and the second switch 230 is controlled to an open state. Current is delivered to the second LEE 120, which begins to emit light at its intended light level.

The supply current $I_{supply}$ may be provided as a constant current or a modulated current. In an example of the latter, the supply current $I_{supply}$ may be in the form of a pulse width modulated (PWM) waveform operable to provide a particular quantity of current to the desired LEE 110, 120, 210, whereby switches 130 and 230 are operable to select which of the LEEs 110, 120, 210 current is to be supplied. The operating voltages of the LEEs 110, 120, and 210 are defined such that selection between the LEEs can be accomplished by setting the aforementioned switching states.

In a further exemplary embodiment, currents are provided to their respective LEEs as average currents described in FIG. 3 above. In particular, the operation of 413 of supplying current to the first light emitting element 110 includes the operation of supplying an average current to the first light emitting element 110:

$$\bar{I}_1 = I_1 \cdot \frac{t_1}{T}$$

where $I_1$ is the amplitude of the current available to the first LEE 110, T is the time period of the current supplied to the first LEE 110, and $t_1$ is the activation period within time period T during which each of the first and second switches 130 and 230 are in an open state to supply current $I_1$ to the first LEE 110. The current amplitude $I_1$ may differ (but not necessarily) from the amplitude of the supply current $I_{supply}$, for example, when one or more of the unselected LEEs conduct current. Accordingly, the current amplitude $I_1$ in the aforementioned equation represent the current which is available to the first LEE 110 upon its selection by the array switches.

Similarly, the operation of 414 of supplying a current to the second LEE 120 may include the operation of supplying an average current to the second light emitting element 120:

$$\overline{I_2} = I_2 \cdot \frac{t_2}{T}$$

where $I_2$ is the amplitude of the current available to the second LEE 120, T is the time period of the current supplied to the second LEE 120, and $t_2$ is the activation period within time period T during which the first switch 130 is in a closed state and the second switch 230 is an open state to supply current $I_2$ to the second LEE 120.

Similarly, the operation 415 of supplying current to the third LEE 210 may include the operation of supplying an average current to the third light emitting element 210:

$$\overline{I_3} = I_3 \cdot \frac{t_3}{T}$$

where $I_3$ is the amplitude of the current available to the third LEE 210, T is the time period of the current supplied to the third LEE 210, and $t_3$ is the activation period within time period T during which the first switch 130 is in an open state and the second switch 230 is a closed state to supply current $I_3$ to the third LEE 210.

State table 420 illustrates selection states, switch states, and selected LEEs in accordance with one specific embodiment of the invention in which LEE 110, LEE 120, or LEE 210 is supplied current, and in which no storage element 160 is used. As illustrated, in state "00," switches 130 and 230 are in an open position and the first LEE 110 is coupled to receive current. In state "01," first switch 130 is in an open position and second switch 230 is in a closed position, whereby the third LEE 210 receives current for operation at it intended light level. In state "10," first switch 130 is in a closed position and second switch 230 is in an open position, whereby second LEE 120 receives current for operation at it intended light level.

As explained above, the operating voltages $V_{OP1}$, $V_{OP2}$ and $V_{OP3}$ can be provided such that LEE 110, LEE 120, and LEE 210 provide a particular on/off profile. In the foregoing embodiment in which state "01" result in substantially all of the supply current $I_{supply}$ being supplied to the third LEE 210, $V_{OP3}$ is substantially lower than $V_{OP1}$ and/or the supplied current $I_{supply}$ is voltage limited sufficiently above $V_{OP3}$ and sufficiently below $V_{OP1}$. Similarly, in the embodiment in which state "10" result in substantially all of the supply current $I_{supply}$ being supplied to the second LEE 120, $V_{OP2}$ is substantially lower than $V_{OP1}$ and/or the supplied current $I_{supply}$ is voltage limited sufficiently above $V_{OP2}$ and sufficiently below $V_{OP1}$.

Alternatively, the voltage operating points $V_{OP1}$, $V_{OP2}$ and $V_{OP3}$ can be altered to permit concurrent operation/light emission from LEE 110 and LEE 120 or LEE 110 and LEE 210. For example, the first and third LEEs 110 and 210 may be both supplied current during operation in state "01," e.g., in generally the same proportion if their corresponding operating voltages $V_{OP1}$ and $V_{OP3}$ are similar, or in another proportion determined in correspondence with the relationship between their operating voltages. Similarly, the first and second LEEs 110 and 120 may be both supplied current during operation in state "10," e.g., in generally the same proportion if their corresponding operating voltages $V_{OP1}$ and $V_{OP2}$ are similar, or in another proportion determined in correspondence with he relationship between their operating voltages.

As explained above, the array's operation in a fourth possible state where the first and second switches 130 and 230 are in a closed state may be precluded by an array controller (not shown). In still another embodiment, current supply $I_{supply}$ to the array may be discontinued if the array is operated in the fourth switch state.

Further exemplary, the fourth switching state may be employed, whereby the current supplied to each of the first, second and third LEEs 110, 120 and 210 is determined by the LEEs' corresponding operating voltages. For example, each of the three LEEs may receive substantially the same portion of current when the three operating voltages are substantially the same. Exemplary of the aforementioned condition in which $V_{OP1} >> V_{OP2}, V_{OP3}$, the first LEE 110 will receive the least (if any) supply current, and the portions of supply current provided to the second and third LEEs 120 and 210 will depend upon the relationship between their respective operating voltages. For example, if $V_{OP1} >> V_{OP2} \approx V_{OP3}$, then each of the second and third LEEs 120 and 210 will receive substantially the same portions of supply current, with the first LEE 110 receiving little if any portion of the supply current. Further exemplary, if $V_{OP1} >> V_{OP2} > V_{OP3}$, then the third LEE 210 will receive the largest portion (and possibly all) of the supply current, second LEE 120 receiving a lesser portion (and possibly none) of the supply current, and first LEE 110 receiving the smallest portion (and possible none) of the supply current. Accordingly, current can be supplied to any one or more LEEs in a particular amount by arranging the operating voltages in a corresponding manner.

Figure 4B:
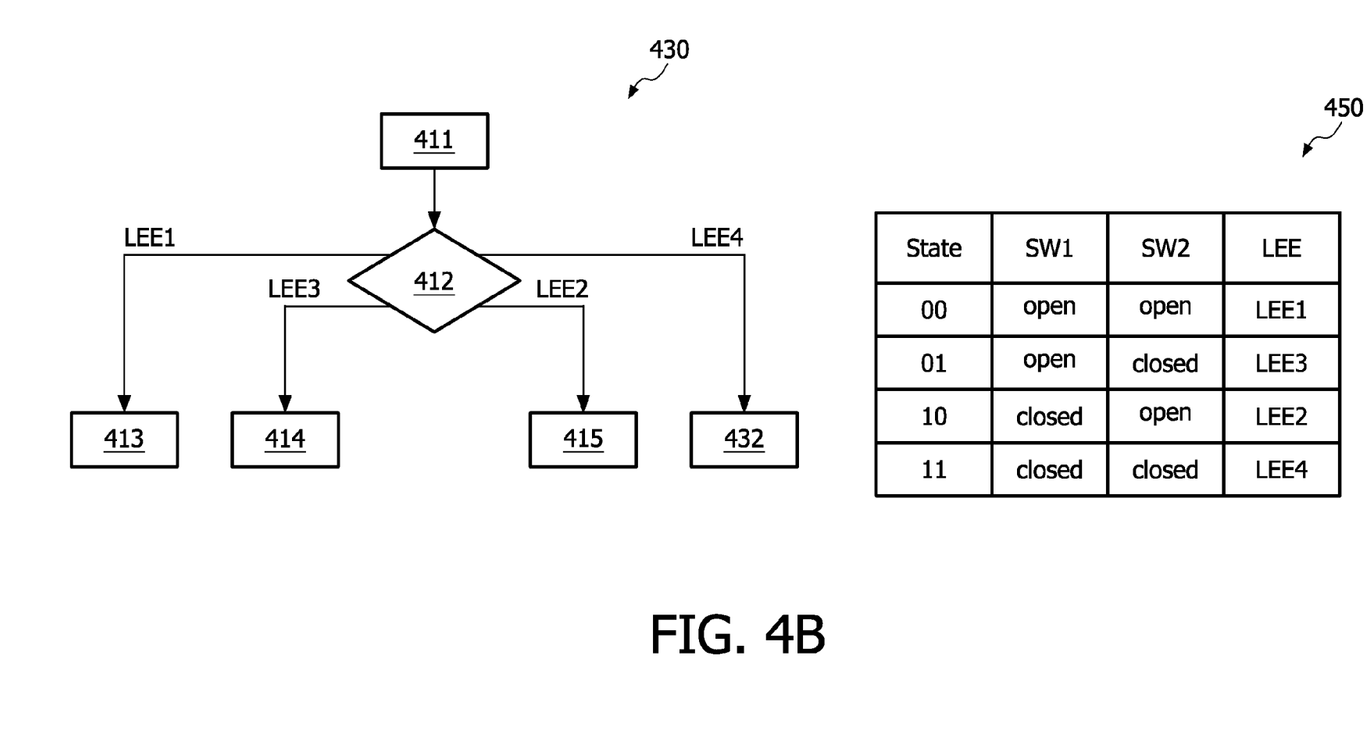
FIG. 4B illustrates a method for operating the light element array shown in FIG. 2B and corresponding state table in accordance with the present invention.

FIG. 4B illustrates a method 430 for operating the light element array 200b having a fourth LEE 220 as shown in FIG. 2B and corresponding state table 450 in accordance with the present invention, with previously identified features retaining their reference indicia. As illustrated in the method diagram 430, the previous operations of supplying current to the first, second and third LLEs 110, 120 and 210 are as provided as described above. In this embodiment, the method of operation includes a further operation at 432, whereby if the fourth LEE 220 is to be selected, the fourth state "11" is selected in which the first and second switches 130 and 230 are provided in a closed state. Current is delivered to the fourth LEE 220, which begins to emit light at its intended level.

The operation 442 of supplying current to the fourth LEE 220 may include the operation of supplying an average current to the fourth light emitting element 220:

$$\overline{I_4} = I_4 \cdot \frac{t_4}{T}$$

where $I_4$ is the amplitude of the current available to the fourth LEE 220, T is the time period of the current supplied to the fourth LEE 220, and $t_4$ is the activation period within time period T during which each of the first and second switches 130 and 230 are in a closed state to supply current $I_4$ to the fourth LEE 220.

As earlier described, the current supplied to the fourth LEE 220 in the fourth switching state of the array illustrated in FIG. 2B will depend upon its relationship to the other three operating voltages $V_{OP1}$, $V_{OP2}$ and $V_{OP3}$. Referring to the foregoing example in which the first operating voltage $V_{OP1}$ is the highest, $V_{OP1} \gg V_{OP4}$, then the current delivered to the fourth LEE in the fourth switching state will depend upon the relationship of $V_{OP4}$ to $V_{OP2}$ and $V_{OP3}$. For example, if $V_{OP1} \gg V_{OP2} \approx V_{OP3} \approx V_{OP4}$, then each of the second, third and fourth LEEs 120, 210 and 220 will receive substantially the same portions of supply current, with the first LEE 110 receiving little if any portion of the supply current. The operating voltages can also be arranged, such that the fourth LEE 220 will receive most, if not all of the supplied current, e.g., when $V_{OP1} \gg V_{OP2}$, $V_{OP3} \gg V_{OP4}$. In this manner, arrangement of the operating voltages can be made so as to enable routing of substantially all of supply current $I_{supply}$ to the fourth LEE 220 when the array operates in the fourth switching state.

Figure 5:
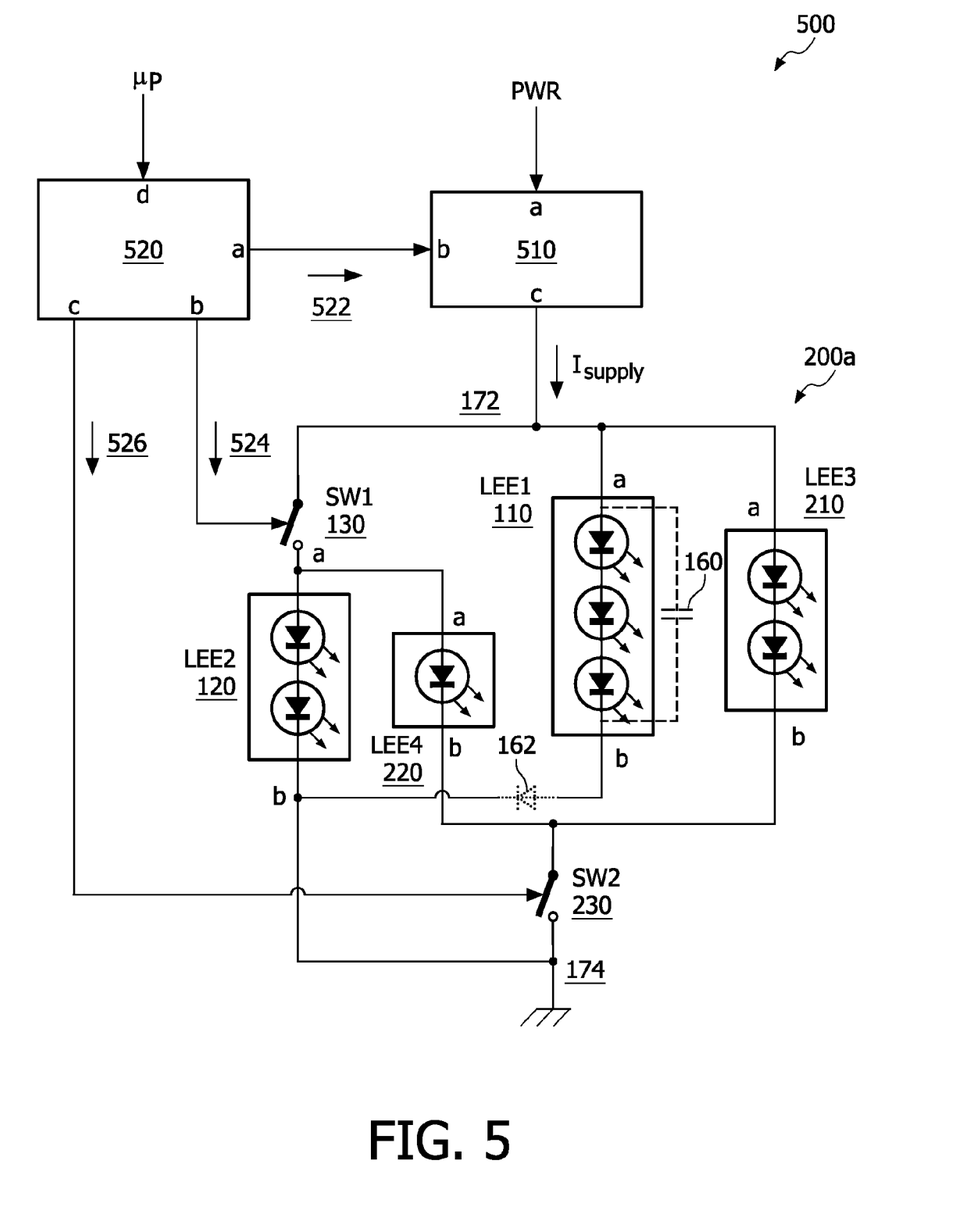
FIG. 5 illustrates a light emitting device incorporating a light element array in accordance with the present invention.

FIG. 5 illustrates a light emitting device 500 incorporating the light element array 100 or 200a, 200b, 200c shown in FIGS. 1, 2A, 2B or 2C in accordance with the present invention, with previously-described features retaining their reference numerals. FIG. 5 is shown implementing the array 200b of FIG. 2B, although the skilled person will appreciate that the array 100 shown in FIG. 1, or the arrays of 200a or 200c in FIGS. 2A and 2C, respectively may be alternatively employed in the light emitting device 500.

In addition to the array 200b, the light emitting device 500 further includes a power supply 510 The power supply 510 includes a power input 510a, a control input 510b, and a current output 510c coupled (directly, or via switches) to the array 200b. The power input 510a is operable to receive power (regulated or un-regulated) which is to be supplied to the array 200b. Control input 510b is operable to set the output level conditions, as will be described below. Current output 510c is operable to supply the power supply current $I_{supply}$ to the array 200. In a specific embodiment, the power supply 510 is operable as a constant-current source, whereby the supply current $I_{supply}$ delivered is substantially independent of the loading conditions.

The LED device 500 further includes a controller 520 operable to provide control signals to the power supply 510 and the first and the second switch 130 and 230 The controller 520 includes a first output 520a coupled to the control input 510a of the power supply 510, and a second output 520b coupled to switch 130. The first output 520a is operable to provide a control signal 522 to the power supply to set output level conditions of the power supply. The second output 520b is operable to provide a control signal 524 to control the state of the first switch 130. In the illustrated embodiment in which the array 200b of FIG. 2B is implemented, the controller 520 further includes a third output 520c coupled to the second switch 230, the third output 520c operable to provide a control signal 526 to control the state of the second switch 230. The controller includes an input port at 520d operable to receive instructions from a microprocessor or another system. Alternatively, the controller 520 itself may be loaded with programming operable to perform the operations as described herein.

As those skilled in the art will appreciate, the current/power supply 510 can be controlled to provide a variety of different output signals to select and/or deactivate the LEEs 110, 120, 210 and 220. For example, in order to obtain constant illumination of an LEE circuit, controller 520 may be made operable to provide a control signal 522 instructing the power supply 510 to output a constant current at a level corresponding to the LEE circuit to be illuminated, the controller 520 further providing controls signals 524 and 526 to set switches 130 and 230 to couple the constant current to the desired LEE in accordance with table 350 or 450 as described above. In a similar manner, the power supply 510 may be controlled to vary the level of the output current $I_{supply}$ to effectuate a change in the LEE's intensity or luminance.

In another embodiment, the current supplied to each of the LEEs 110, 120, 210 and 220 is in the form of an average current $\bar{I}_i$ described in FIGS. 3, 4A and 4B above. In one example of such an embodiment, the time period T is 10 ms, and activation times $t_1$, $t_2$, $t_3$, and $t_4$ are 5 ms, 2 ms, 2 ms, and 1 ms, respectively. Such an arrangement results in the average current $\bar{I}_{1,2,3,4}$ of the first, second, third, and fourth LEEs being 50%, 20%, 20% and 10% of the supply current level $I_{supply}$, assuming that there is no substantial different between the current $I_i$ which is available to the selected LEE and the supply current $I_{supply}$ (i.e., no substantial conduction by non-selected LEEs occurs). Those skilled in the art will appreciate that different current ratios can be obtained, depending upon the desire amount of current which is to be supplied to a particular LEE. For example, the time period T may be chosen so as to further avoid the human perception of flickering, in which case a shorter time period (e.g., 2.5 ms) may be selected. Furthermore, the activation time $t_i$ may also be correspondingly varied to maintain a percentage of the current level $I_{supply}$.

It is further noted that the supply current level $I_{supply}$ may be provided at a constant level, or alternatively, at a varying level. Combining the different states to select the LEE with the possibility to vary the supply current level allows two substantially independent degrees of freedom in controlling the LEEs.

In a further exemplary embodiment, the array 200b employs shunt capacitor(s) coupled across one or more of the LEE circuits 110, 120, 210 and 220 (LEE circuit 120 illustrating a shunt capacitor 160 in FIG. 5, although several or all LEEs may employ shunt capacitors), the array 200b operating to provide an average current $\bar{I}_i$, to their corresponding LEEs 110, 120, 210 and 220, such as in the example above in which average currents $\bar{I}_{1,2,3,4}$ are provided at 5 ms, 2 ms, 2 ms, and 1 ms, respectively over a time period T of 10 ms. Providing parallel-coupled capacitors to one or more of the LEEs may be used to provide continuous illumination of a particular LEE circuit for a period of time, or to permit concurrent illumination of two or more LEEs, the latter condition arising, for example, when a previously-inactive LEE is switched to receive its corresponding $\bar{I}_i$, and a second LEE is decoupled from the power supply, the second LEE's shunt capacitor providing current to drive its LEE for continued operation.

The size of the capacitors 160 (each of which may be the same or different) is based upon several factors, including the time period T of the current $\bar{I}_i$, the acceptable magnitude of rippled within the current $\bar{I}_i$ delivered to the coupled LEE, and the duration of "off state operation," "off state operation" referring to the condition in which the stored charge of a coupled capacitor 160 operates the corresponding LEE after switches 130 and 230 switch the LEE out of the power supply. As will be appreciated, smaller capacitors can be employed when current $\bar{I}_i$ includes a shorter time period, and/or when the off state activation time is shorter, and/or when a larger magnitude of ripple in $\bar{I}_i$ is desired or acceptable. A larger capacitance may be employed in instances in which a longer time period T is provided by current $\bar{I}_i$, and/or when a longer off state activation period is sought, and/or when a smaller ripple magnitude in $\bar{I}_i$ is desired or required.

Another factor possibly impacting the size selection for capacitor(s) 160 is the acceptable delay in selecting or deactivating the LED circuits employing shunt capacitor 160. In particular, the size of the capacitor 160 may inhibit how fast a previously-inactive LED circuit can reach its operating voltage condition $V_{OP}$, or how fast a previously-active LEE can be deactivated. In such circumstances, the rise and fall time transitions between inactive and active states of the supplied average current $\bar{I}_i$ can be degraded beyond an acceptable limit, resulting in erroneous emission of light in some circumstances (delayed deactivation of an LED circuit), and/or the omission of light in other circumstance (delayed selection of an LEE).

One exemplary approach for minimizing the delayed selection/deactivation effects which the shunt capacitor(s) 160 have on their coupled LEEs is to provide an intermittent compensation effect to accelerate the rise and fall time transitions. For example, the rise time transition of a previously-inactive LEE to an active state can be accelerated by providing, for a short period of time, a higher current level to the LEE, thereby charging its shunt capacitor 160 faster and achieving the forward voltage sooner than if the desired current level $I_i$ is applied constantly over time t during which the particular LEE circuit is active. Due to the certain voltage-current characteristics of certain LEEs, for example an LED which might be used as a light emitting element, with lower forward voltages the forward current might drop. Discharging the capacitor by delivering the energy to the LED may result in a long time period in which only very little but noticeable light is produce by the LED. Connecting an additional load with appropriate characteristics (e.g. resistor or a serial connection of a resistor and a zener-diode) can be used to speed up the final off-state of the diode. In addition, the controller 520 can be programmed in a way to compensate the missing or additional light output from a LED with a shunt capacitor and can compensate this with respect to the time averaged light output.

In summary it may be seen as one aspect of the present invention that LEE circuits having different operating voltage points (i.e., turn on voltages) are employed in order to reduce the number of switches below the 1:1 ratio of switches to light emitting elements, for example, providing one switch for two light emitting elements, two switches for three light emitting elements, or two switches for four light emitting elements. In this manner, the component count for the light element array can be reduced, providing a faster, more power efficient and lower cost light emitting device.

As readily appreciated by those skilled in the art, the described processes may be implemented in hardware, software, firmware or a combination of these implementations as appropriate. In addition, some or all of the described processes may be implemented as computer readable instruction code resident on a computer readable medium (removable disk, volatile or non-volatile memory, embedded processors, etc.), the instruction code operable to program a computer of other such programmable device to carry out the intended functions.

It should be noted that the term "comprising" does not exclude other features, and the definite article "a" or "an" does not exclude a plurality, except when indicated. It is to be further noted that elements described in association with different embodiments may be combined. It is also noted that reference signs in the claims shall not be construed as limiting the scope of the claims. The term "coupling" is used to indicate either a direct connection between two features, or an indirect connection, via an intervening structure, between two features. Operations illustrated in flow charts are not limited to the particular sequence shown, and later numbered operations may be performed currently with, or in advance of earlier number operations in accordance with the invention.

The foregoing description has been presented for purposes of illustration and description. It is not intended to be exhaustive or to limit the invention to the precise form disclosed, and obviously many modifications and variations are possible in light of the disclosed teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

The invention claimed is:

1. A light element array, comprising:
a first light emitting element having a first terminal and a second terminal;
a second light emitting element having a first terminal, and a second terminal coupled to the second terminal of the first light emitting element;
a third light emitting element having a first terminal coupled to the first terminal of the first light emitting element and a second terminal;
a first switch having a first terminal coupled to each of the first terminals of the first and third light emitting elements, and a second terminal coupled to the first terminal of the second light emitting element; and
a second switch having a first terminal coupled to the second terminal of the third light emitting element, and a second terminal coupled to each of the second terminals of the first and second light emitting elements, wherein
the first terminal of the first light emitting element is coupled to a first power supply rail and the second terminal of the first light emitting element is coupled to a second power supply rail, and
the first, second, and third light emitting elements are characterized by respective first, second, and third operating voltages (VOP1, VOP2, VOP3), the relative relationships of which is defined by the equation:

$V_{OP1} > V_{OP2}, V_{OP3}$ the second light emitting element being adapted to receive at least a portion of current supplied to the first or second power supply rails when the first switch is in a closed state and the second switch is in an open state; and the third light emitting element being adapted to receive at least a portion of current supplied to the light element array when the first switch is in an open state and the second switch is in a closed state.

2. The light element array of claim 1, wherein each of the first, second, and third light emitting elements is selected from a group consisting of a light emitting diode, an organic light emitting diode, an AC light emitting diode, a laser diode and an incandescent light.

3. The light element array of claim 1, further comprising a storage element coupled to one or more of the first, second, or third light emitting elements.

4. The light element array of claim 3, wherein the storage element comprises a capacitance coupled in parallel with one or more of the first, second, or third light emitting elements.

5. The light element array of claim 1, further comprising a fourth light emitting element having a first terminal coupled to the second terminal of the first switch, and a second terminal coupled to the first terminal of the second switch, the fourth light emitting element characterized by a fourth operating voltage (VOP4) at or above which the fourth light emitting element is operable to emit light.

6. The light element array of claim 5,
wherein the first terminal of the first light emitting element is coupled to a first power supply rail and the second terminal of the first light emitting element is coupled to a second power supply rail, and
wherein the fourth light emitting element is adapted to receive at least a portion of current supplied to the light element array (200b) when the first and second switches are each in a closed state.

7. The light element array of claim 5, wherein the first, second, third and fourth light emitting elements (110, 120, 210, 220) are characterized by respective first, second, third and fourth operating voltages (VOP1, VOP2, VOP3, VOP4), the relative relationships of which is defined by the equation:

$$V_{OP1} > V_{OP2}, V_{OP3} > V_{OP4}.$$

8. The light element array of claim 5, further comprising a storage element coupled to the fourth light emitting element.

9. The light element array of claim 8, wherein the storage element comprises a capacitance coupled in parallel with the fourth light emitting element.

10. The light element array of claim 1, further comprising a short circuit coupled between the second terminal of the first switch, and the first terminal of the second switch.

11. A light emitting device, comprising:
the light element array as claimed in claim 1;
a power supply (510) having a control input (510b), and a power output (510c) coupled to supply current to the light element array; and
a controller (520) having a first output (520a) coupled to the control input (510b) of the power supply (510), a second output (520b) coupled to first switch of the light element array, and a third output (520c) coupled to the second switch of the light element array (200), the first output (520a) operable to provide a control signal (522) to the power supply (510) to set output level conditions of the power supply (510), and the second output (520b) operable to provide a control signal (524) to control the state of the first switch, and the third output (520c) operable to provide a control signal 526 to control the state of the second switch.

12. A method for operating a light element array, the light element array including a first light emitting element having a first terminal coupled to a first power supply rail and a second terminal coupled to a second power supply rail, a second light emitting element having a first terminal, and a second terminal coupled to the second terminal of the first light emitting element, a third light emitting element having a first terminal coupled to the first terminal of the first light emitting element and a second terminal, a first switch having a first terminal coupled to each of the first terminals of the first and third light emitting elements, and a second terminal coupled to the first terminal of the second light emitting element, and a second switch having a first terminal coupled to the second terminal of the third light emitting element, and a second terminal coupled to each of the second terminals of the first and second light emitting elements, the method comprising:
controlling each of said first and second switches to either an open state or a closed state, and
supplying current to the first or second power supply rail of the light element array,
wherein at least a portion of the supplied current is supplied to the first light emitting element when each of the first and second switches is in an open state,
wherein at least a portion of the supplied current is supplied to the second light emitting element when the first switch is in a closed state, and the second switch is in an open state; and
wherein at least a portion of the supplied current is supplied to the third light emitting element when the first switch is in an open state, and the second switch is in a closed state.

13. The method of claim 12, wherein the current supplied to the first light emitting element comprises an average current:

$$\overline{I_1} = I_1 \cdot \frac{t_1}{T}$$

where I1 is the amplitude of the current supplied to the first light emitting element, T is the time period of the current supplied to the first light emitting element, and t1 is the activation period during which each of the first and second switches are in an open state to supply current I1 to the first light emitting element.

14. The method of claim 12, wherein the current supplied to the second light emitting element comprises an average current:

$$\overline{I_2} = I_2 \cdot \frac{t_2}{T}$$

where I2 is the amplitude of the current supplied to the second light emitting element, T is the time period of the current supplied to the second light emitting element and t2 is the activation period during which the first switch is in a closed state and the second switch is an open state to supply current I2 to the second light emitting element.

15. The method of claim 12, wherein the current supplied to the third light emitting element comprises an average current:

$$\overline{I_3} = I_3 \cdot \frac{t_3}{T}$$

where I3 is amplitude of the current supplied to the third light emitting element T is the time period of the current supplied to the third light emitting element, and t3 is the activation period during which the first switch is in an open state and the second switch is a closed state to supply current I3 to the third light emitting element.

16. The method of any one of claim 12, wherein the light element array further includes a fourth light emitting element having a first terminal coupled to the second terminal of the first switch, and a second terminal coupled to the first terminal of the second switch and wherein controlling comprises controlling each of the first and second switches to a closed state, wherein at least a portion of the supply current is supplied to the fourth light emitting element.

17. The method of claim 16, wherein the current supplied to the fourth light emitting element comprises an average current:

$$\overline{I_4} = I_4 \cdot \frac{t_4}{T}$$

where I4 is the amplitude of the current supplied to the fourth light emitting element, T is the time period of the current supplied to the fourth light emitting element, and t4 is the activation period during which the first and second switches are in a closed state to supply current I4 to the fourth light emitting element.

* * * * *